United States Patent
Heath et al.

(10) Patent No.: US 8,631,188 B1
(45) Date of Patent: Jan. 14, 2014

(54) DATA STORAGE DEVICE OVERLAPPING HOST DATA TRANSFER FOR A WRITE COMMAND WITH INTER-COMMAND DELAY

(75) Inventors: Mark A. Heath, Oklahoma City, OK (US); Kenny T. Coker, Corona, CA (US); Praveen Viraraghavan, Lake Forest, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 743 days.

(21) Appl. No.: 12/553,012

(22) Filed: Sep. 2, 2009

(51) Int. Cl.
*G06F 13/20* (2006.01)

(52) U.S. Cl.
USPC ............................ 711/103; 711/154; 711/167

(58) Field of Classification Search
USPC .......................................... 711/103, 154, 167
See application file for complete search history.

(56) References Cited

U.S. PATENT DOCUMENTS

| | | | |
|---|---|---|---|
| 5,129,072 A | 7/1992 | Larner et al. | |
| 5,603,066 A | 2/1997 | Krakirian | |
| 5,640,593 A | 6/1997 | Krakirian | |
| 5,768,548 A * | 6/1998 | Young et al. | 710/306 |
| 6,055,598 A | 4/2000 | Lange | |
| 6,252,544 B1 * | 6/2001 | Hoffberg | 342/357.31 |
| 6,594,713 B1 * | 7/2003 | Fuoco et al. | 710/31 |
| 2003/0163639 A1 | 8/2003 | Baum et al. | |

* cited by examiner

*Primary Examiner* — Kenneth Lo

(57) ABSTRACT

A data storage device is disclosed comprising a non-volatile memory, such as a disk of a disk drive or a non-volatile semiconductor memory. First and second write commands are received from a host, and in response first and second write data are requested from the host. The first write data is stored in the non-volatile memory, and after storing the first write data, a first acknowledge is transmitted to the host to acknowledge completion of the first write command. After transmitting the first acknowledge, a third write command is received from the host. The second write data is stored in the non-volatile memory, and after storing the second write data, a second acknowledge is transmitted to the host acknowledging completion of the second write command. After transmitting the second acknowledge, third write data is requested from the host associated with the third write command.

12 Claims, 5 Drawing Sheets

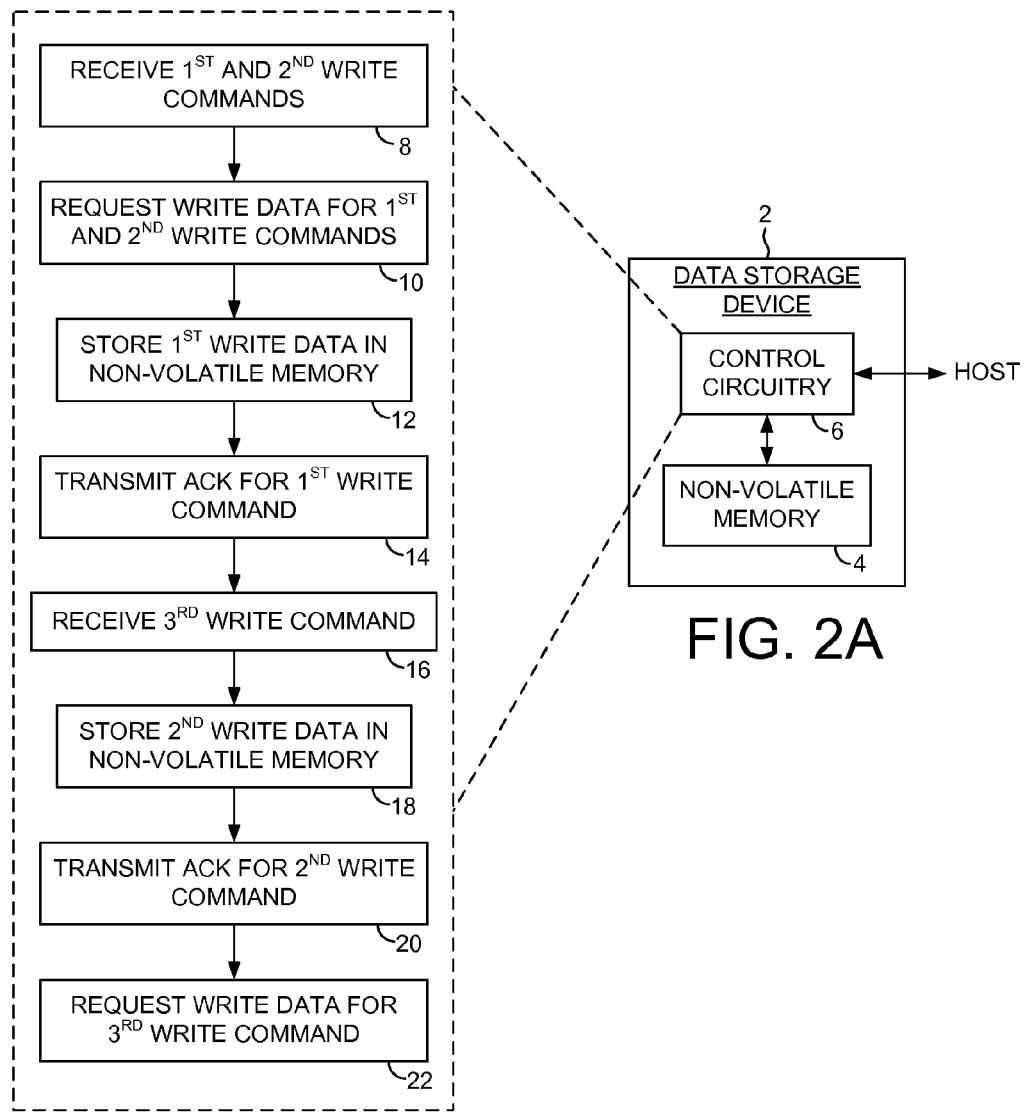

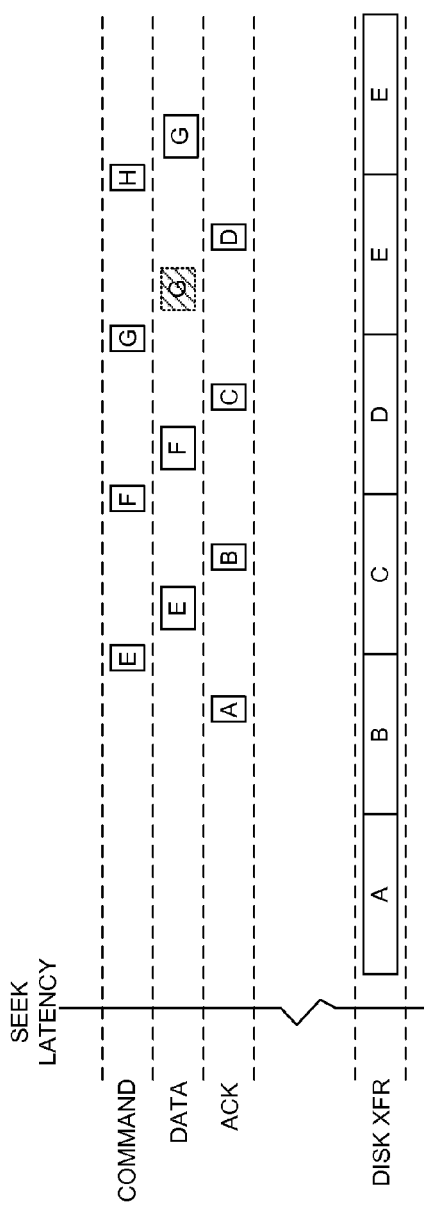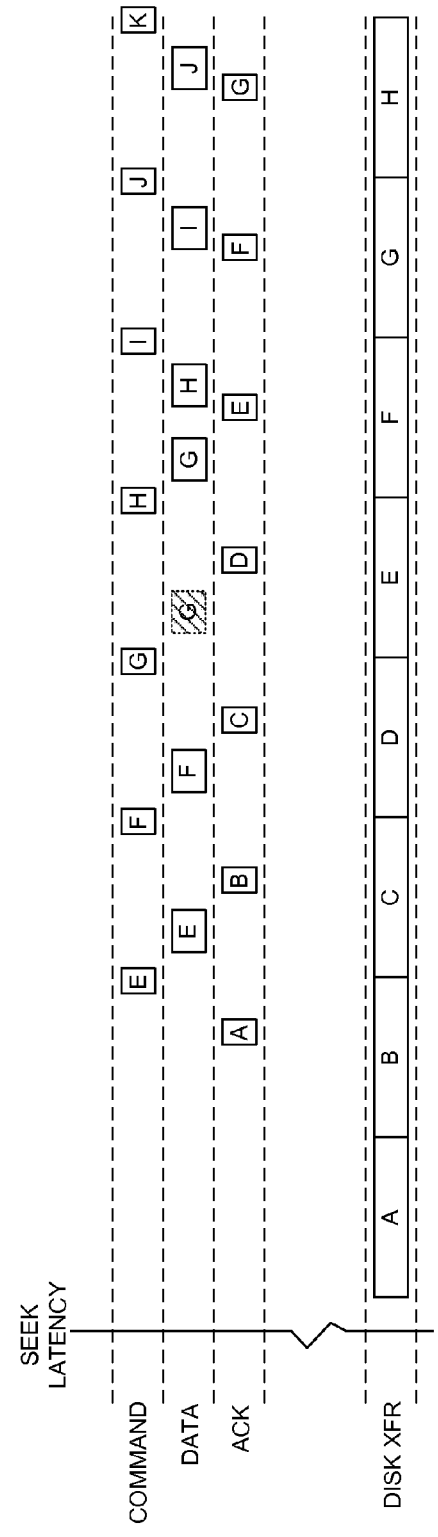

DATA STORAGE DEVICE OVERLAPPING HOST DATA TRANSFER FOR A WRITE COMMAND WITH INTER-COMMAND DELAY

BACKGROUND

Data storage devices (e.g., disk drives and solid state drives) employed in computer systems may process sequential write commands received from a host, for example, when streaming data is written by the host. To implement sequential writes, the data storage device typically caches the write data of a number of write commands before the write data is transferred to a non-volatile memory, such as a disk or a non-volatile semiconductor memory. To maximize throughput it is desirable that write commands be received from the host at a rate that at least matches the transfer rate to the non-volatile memory. In the case of a disk drive, this ensures the disk does not slip a revolution due to the host transfer rate falling behind the disk transfer rate.

FIG. 1 shows a prior art command sequence for a data storage device processing sequential write commands received from a host. In this example, the data storage device caches the write data of four write commands (A, B, C, D) before the transfer to the non-volatile memory begins (a disk in this example). Once the write data for the A write command has been transferred to the non-volatile memory, the disk drive sends an acknowledge (ACK) to the host indicating that the A write command has been processed and that a new command may be sent. After an inter-command delay (I), the host sends an E write command to the data storage device, wherein the data storage device responds by requesting the write data from the host. FIG. 1 illustrates an overhead (O) associated with transferring the E write command and the corresponding write data by the host, as well as the transfer interval (S) required to transfer the write data. In order for the transfer rate of the write commands from the host to keep up with the transfer rate of the write data to the non-volatile memory, the overhead (O) must remain small to ensure the entire host cycle is less than the block transfer to the non-volatile memory.

BRIEF DESCRIPTION OF THE DRAWINGS

FIG. 2A shows a data storage device according to an embodiment of the present invention comprising a non-volatile memory and control circuitry.

FIG. 2B is a flow diagram executed by the control circuitry according to an embodiment of the present invention wherein write data for a pending write command is received from the host while waiting to receive a next write command from the host.

FIGS. 4A-4E illustrate an embodiment of the present invention wherein the request for write data is not deferred until a sufficient number of write commands have been received from the host.

DETAILED DESCRIPTION OF EMBODIMENTS OF THE INVENTION

FIG. 2A shows a data storage device 2 according to an embodiment of the present invention comprising a non-volatile memory 4 and control circuitry 6 operable to execute the flow diagram of FIG. 2B. A first and second write commands are received from a host (step 8). First and second write data are requested from the host associated with the first and second write commands (step 10). The first write data is stored in the non-volatile memory (step 12), and after storing the first write data, a first acknowledge is transmitted to the host to acknowledge completion of the first write command (step 14). After transmitting the first acknowledge, a third write command is received from the host (step 16). The second write data is stored in the non-volatile memory (step 18), and after storing the second write data, a second acknowledge is transmitted to the host acknowledging completion of the second write command (step 20). After transmitting the second acknowledge, third write data is requested from the host associated with the third write command (step 22).

Figure 3:
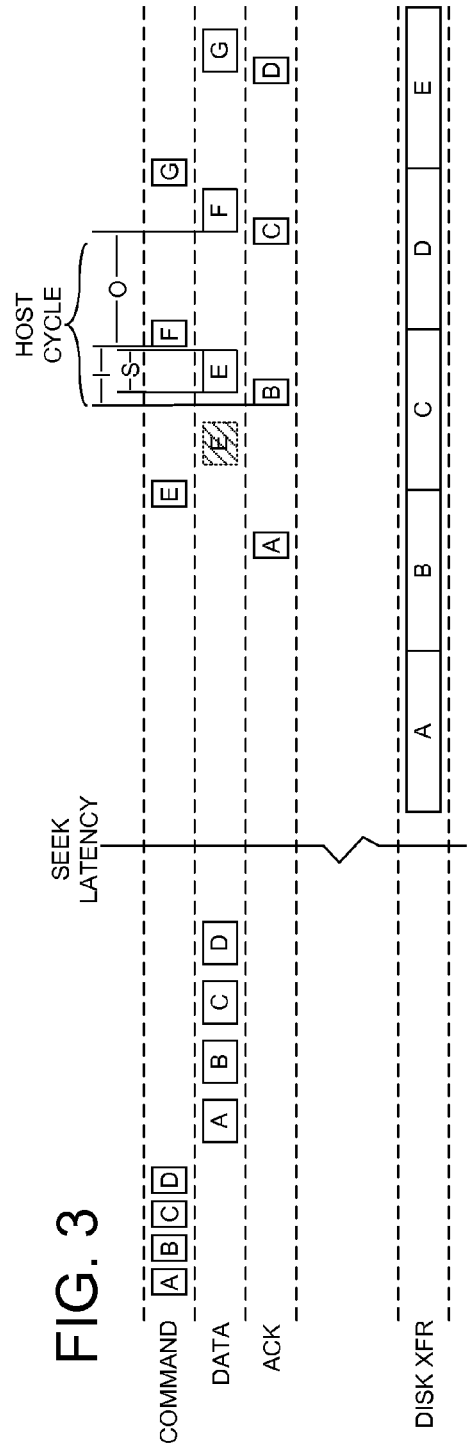
FIG. 3 illustrates an embodiment of the present invention wherein requesting of write data is deferred until after an acknowledge has been transmitted to the host.

FIG. 3 illustrates an embodiment of the present invention wherein the data storage device receives four sequential write commands (A, B, C, D) and thereafter requests and receives the write data (A, B, C, D) associated with the write commands. After storing the write data associated with the A write command in the non-volatile memory, an acknowledge (ACK) is transmitted to the host to acknowledge completion of the A write command. When the ACK is transmitted, it signifies to the host that the data storage device is ready to receive the next write command. After an inter-command delay, the host transmits the next write command (the E write command) to the data storage device. When the data storage device receives the E write command, it defers the request to receive the write data associated with the E write command until after the ACK for the B write command has been transmitted to the host. After transmitting the ACK for the B write command, the data storage device requests the write data associated with the E write command so that the write data is received during the inter-command delay (I) for the next write command (the F write command). This process of deferring the request for the write data until after the ACK has been transmitted for a previous write command continues for subsequent write commands as illustrated in FIG. 3. Overlapping the transfer of the write data with the inter-command delay allows the overhead (O) to increase while the entire host cycle remains less than the block transfer to the non-volatile memory.

In one embodiment, the firmware responsible for automating the transfer of the write data is unaware of the initial number of pending write commands and corresponding number of ACKs that will be transmitted. Therefore, before deferring a write data transfer the firmware ensures a sufficient number of automated write commands have been received before enabling the deferral. This embodiment is illustrated in FIGS. 4A-4E wherein a write data transfer is not deferred until the write data for at least two automated write commands have been received (where the initial four write commands A, B, C, D are not considered automated write commands). Thereafter, a write data transfer is deferred only if it is the only write command on the automation stack (i.e., the next write command kicks the pending write data transfer out of the deferred state).

Figure 4A:
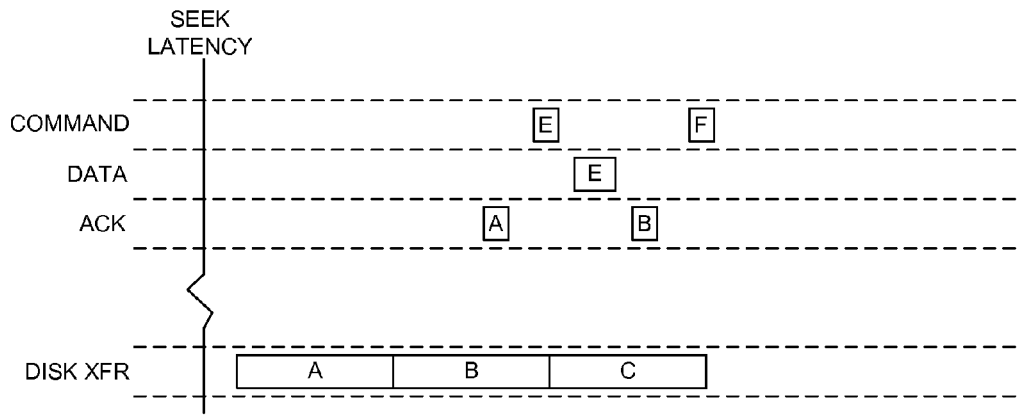
Figure 4B:
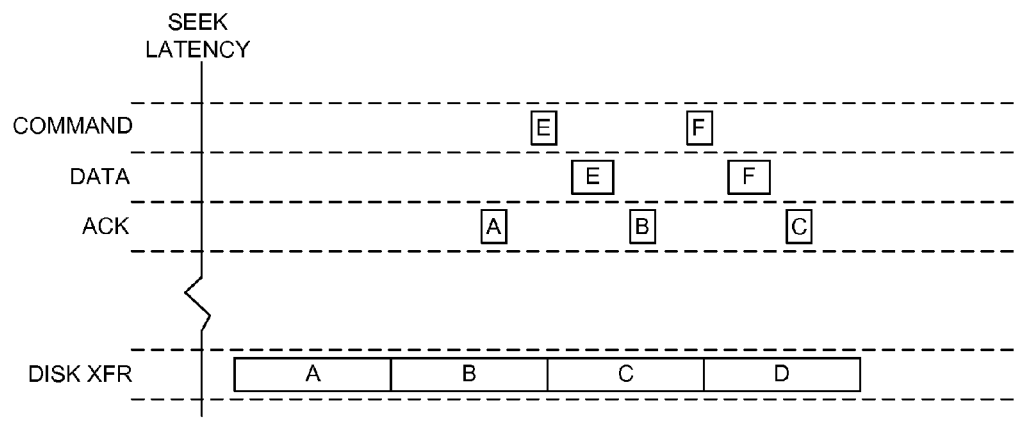
Figure 4C:
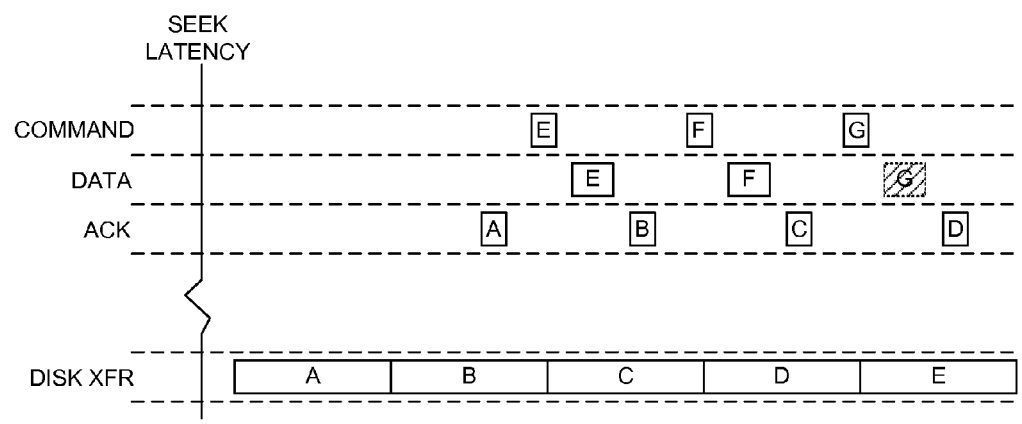

Referring to FIG. 4A, when the E write command is received the data transfer for the write command is not deferred since there are zero write commands in the data-complete queue. Similarly in FIG. 4B, when the F write command is received the data transfer for the write command is not deferred since there is one write command in the data-complete queue. When the G write command is received as shown in FIG. 4C, the write data transfer is deferred since there are two write commands in the data-complete queue (two write commands where the write data transfer from the host has completed). When the next write command is received (the H write command) as shown in FIG. 4D, the write data transfer for the G write command is executed (no longer deferred). In addition, at this point a sufficient number of write commands have been processed to enable the pairing of the ACKs with subsequent write data transfers. Referring to FIG. 4E, the ACK for the E write command is paired with the write data transfer for the H write command and so on.

Figure 1:
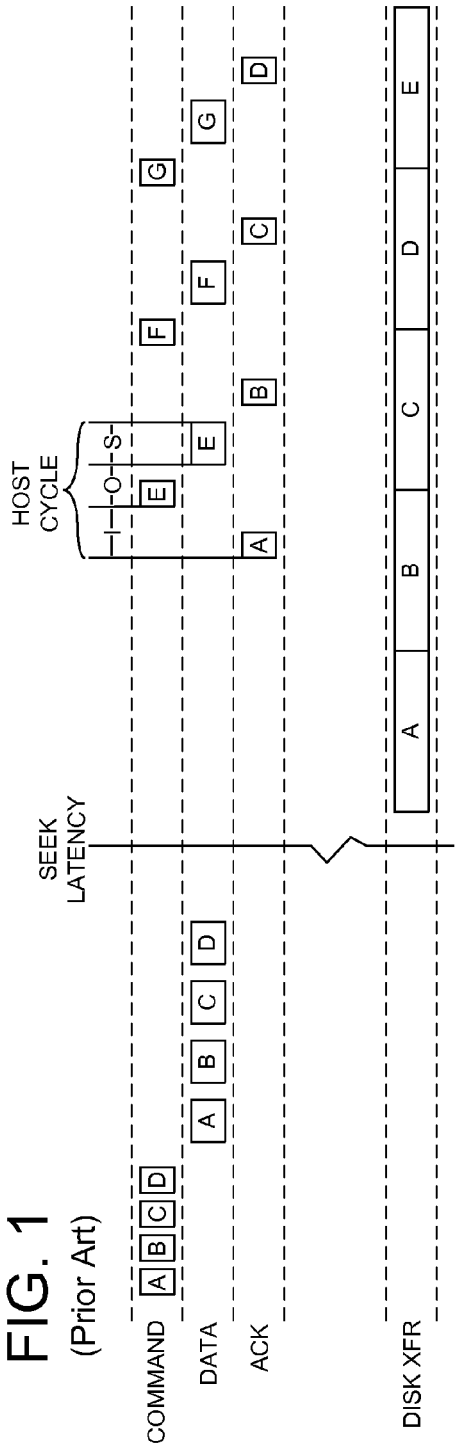
FIG. 1 shows a prior art command sequence for a data storage device processing sequential write commands received from a host.

The embodiments of the present invention may be employed in connection with any suitable communication protocol. For example, the prior art command sequence shown in FIG. 1 is typically employed in the Serial Attached SCSI (SAS) communication protocol, wherein the embodiments of the present invention modifies the command sequence while remaining compliant with the protocol. However, the embodiments of the present invention may be used with other communication protocols, such as the Serial ATA (SATA) communication protocol or the Universal Serial Bus (USB) communication protocol. In the embodiments of the present invention described above, a queue depth of four is used for the write commands; however, any suitable queue depth may be employed.

Figure 5:
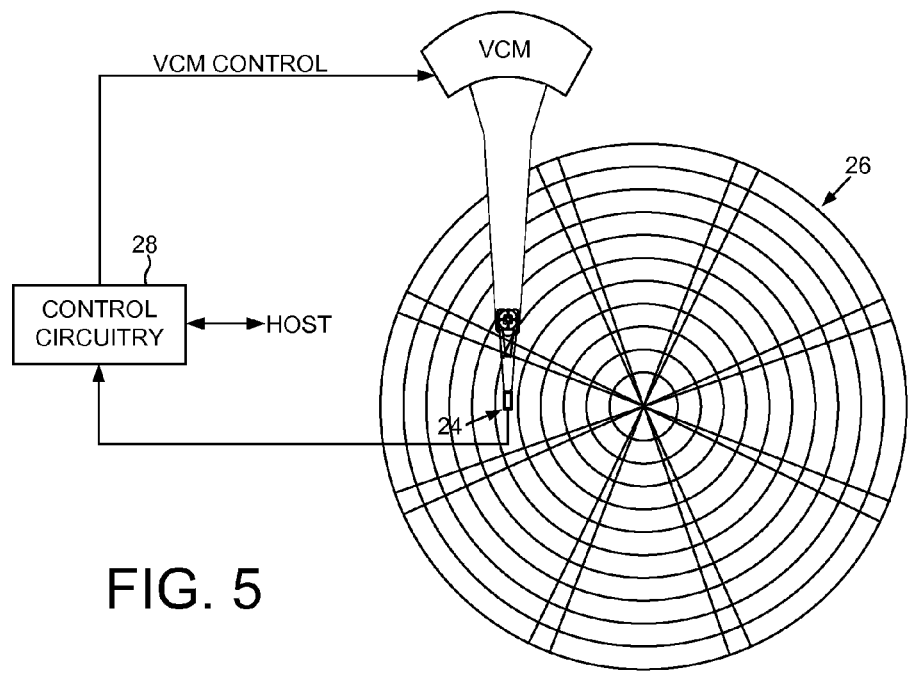
FIG. 5 shows an embodiment of the present invention wherein the data storage device comprises a disk drive.
Figure 6:
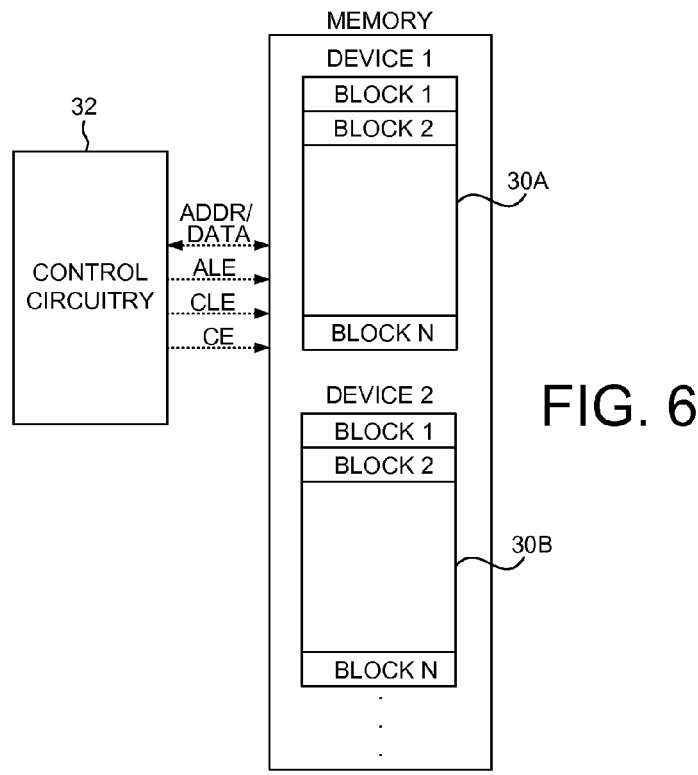
FIG. 6 shows an embodiment of the present invention wherein the data storage device comprises a solid state drive.

The embodiments of the present invention may be employed in any suitable data storage device. FIG. 5 shows a data storage device comprising a disk drive including a head 24 actuated over a disk 26 and control circuitry 28 for executing the flow diagrams described herein. FIG. 6 shows a solid state drive comprising a plurality of non-volatile semiconductor memories 30A, 30B, etc., such as flash memories, and control circuitry 32 for executing the flow diagrams described herein. A hybrid data storage device may also be employed comprising components of a disk drive shown in FIG. 5 combined with the non-volatile semiconductor memories shown in FIG. 6.

Any suitable control circuitry may be employed to implement the flow diagrams in the embodiments of the present invention, such as any suitable integrated circuit or circuits. In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a system on a chip (SOC). In another embodiment, the instructions are read into a volatile semiconductor memory when the data storage device is powered on. In yet another embodiment, the control circuitry comprises suitable logic circuitry, such as state machine circuitry.

What is claimed is:

1. A data storage device comprising:
    a non-volatile memory; and
    control circuitry operable to:
        receive a first write command and a second write command from a host;
        request first write data and second write data from the host associated with the first write command and the second write command;
        store the first write data in the non-volatile memory;
        after storing the first write data, transmit a first acknowledge to the host to signal the host to transmit a third write command;
        after transmitting the first acknowledge, receive the third write command from the host;
        store the second write data in the non-volatile memory;
        after storing the second write data and after receiving the third write command, transmit a second acknowledge to the host to signal the host to transmit a fourth write command; and
        after transmitting the second acknowledge, request third write data from the host associated with the third write command.

2. The data storage device as recited in claim 1, wherein the control circuitry is further operable to receive the third write data from the host while waiting to receive the fourth write command from the host.

3. The data storage device as recited in claim 2, wherein the control circuitry is further operable to:
    receive the fourth write command from the host;
    store pending write data associated with a pending write command in the non-volatile memory;
    after storing the pending write data and after receiving the fourth write command, transmit a third acknowledge to the host to signal the host to transmit a fifth write command; and
    after transmitting the third acknowledge, request fourth write data from the host associated with the fourth write command.

4. The data storage device as recited in claim 3, wherein the control circuitry is further operable to receive the fourth write data from the host while waiting to receive the fifth write command from the host.

5. The data storage device as recited in claim 1, wherein the non-volatile memory comprises a disk of a disk drive.

6. The data storage device as recited in claim 1, wherein the non-volatile memory comprises a semiconductor memory.

7. A method of operating a data storage device comprising a non-volatile memory, the method comprising:
    receiving a first write command and a second write command from a host;
    requesting first write data and second write data from the host associated with the first write command and the second write command;
    storing the first write data in the non-volatile memory;
    after storing the first write data, transmitting a first acknowledge to the host to signal the host to transmit a third write command;
    after transmitting the first acknowledge, receiving the third write command from the host;
    storing the second write data in the non-volatile memory;
    after storing the second write data and after receiving the third write command, transmitting a second acknowledge to the host to signal the host to transmit a fourth write command; and
    after transmitting the second acknowledge, requesting third write data from the host associated with the third write command.

8. The method as recited in claim 7, wherein the third write data is received from the host while waiting to receive the fourth write command from the host.

9. The method as recited in claim 8, further comprising:
    receiving the fourth write command from the host;

storing pending write data associated with a pending write command in the non-volatile memory;

after storing the pending write data and after receiving the fourth write command, transmitting a third acknowledge to the host to signal the host to transmit a fifth write command; and after transmitting the third acknowledge, requesting fourth write data from the host associated with the fourth write command.

10. The method as recited in claim 9, wherein the fourth write data is received from the host while waiting to receive the fifth write command from the host.

11. The method as recited in claim 7, wherein the non-volatile memory comprises a disk of a disk drive.

12. The method as recited in claim 7, wherein the non-volatile memory comprises a semiconductor memory.

* * * * *